United States Patent
Yang et al.

(10) Patent No.: US 12,152,838 B2
(45) Date of Patent: Nov. 26, 2024

(54) FLASH CLOSED HEAT EXCHANGER

(71) Applicant: JINGKELUN REFRIGERATION EQUIPMENT CO., LTD., Beijing (CN)

(72) Inventors: Jianguo Yang, Beijing (CN); Chengjun Zhou, Beijing (CN); Jianhui Kang, Beijing (CN); Weibo Xie, Beijing (CN); Wenjie Cao, Beijing (CN); Tongqin Mao, Beijing (CN); Hui Zhao, Beijing (CN); Lixuan Hao, Beijing (CN)

(73) Assignee: JINGKELUN REFRIGERATION EQUIPMENT CO., LTD., Beijing (CN)

( * ) Notice: Subject to any disclaimer, the term of this patent is extended or adjusted under 35 U.S.C. 154(b) by 452 days.

(21) Appl. No.: 17/606,044

(22) PCT Filed: Apr. 16, 2020

(86) PCT No.: PCT/CN2020/085059
§ 371 (c)(1),
(2) Date: Oct. 24, 2021

(87) PCT Pub. No.: WO2020/228474
PCT Pub. Date: Nov. 19, 2020

(65) Prior Publication Data
US 2022/0252351 A1    Aug. 11, 2022

(30) Foreign Application Priority Data

May 16, 2019  (CN) .......................... 201910407748.6
Jul. 22, 2019  (CN) .......................... 201910663396.0

(51) Int. Cl.
F28D 5/02    (2006.01)
F28F 25/06   (2006.01)

(52) U.S. Cl.
CPC ................ *F28D 5/02* (2013.01); *F28F 25/06* (2013.01); *F28F 2250/08* (2013.01)

(58) Field of Classification Search
CPC .......... F28D 5/02; F28F 25/06; F28F 2250/08
(Continued)

(56) References Cited

U.S. PATENT DOCUMENTS 4,076,771 A   2/1978  Houx, Jr. et al.
4,576,014 A   3/1986  Miller et al.
(Continued)

FOREIGN PATENT DOCUMENTS

CN    204202431 U    3/2015
CN    105115315 A   12/2015
(Continued)

OTHER PUBLICATIONS

Japanese Patent Office, First Office Action Issued in Application No. 2021-563321, Nov. 29, 2022, 13 pages.
(Continued)

*Primary Examiner* — Claire E Rojohn, III
(74) *Attorney, Agent, or Firm* — Kilpatrick Townsend & Stockton LLP

(57) ABSTRACT

Disclosed is a flash closed heat exchanger, comprising a closed housing. A negative pressure fan is provided on the closed housing. A negative pressure environment is formed inside the closed housing by means of the negative pressure fan. A water atomization device is provided inside the closed housing. The water atomization device sprays atomized water into the inside of the closed housing, so that the atomized water evaporates into steam in the negative pressure environment. In the flash closed heat exchanger, the evaporation of atomized water is promoted in a closed negative pressure environment.

17 Claims, 8 Drawing Sheets

(58) Field of Classification Search
USPC .......................................................... 62/259.4
See application file for complete search history.

(56) References Cited

U.S. PATENT DOCUMENTS

| | | | |
|---|---|---|---|
| 7,128,310 B2 | 10/2006 | Mockry et al. | |
| 8,622,372 B2* | 1/2014 | Schreiber | F28F 25/10 |
| | | | 261/153 |
| 9,243,847 B2* | 1/2016 | Benz | F28F 27/003 |
| 9,453,687 B2* | 9/2016 | Kwon | F28B 1/06 |
| 2003/0070547 A1 | 4/2003 | Hubbard et al. | |
| 2003/0071373 A1* | 4/2003 | Hubbard | F28F 25/00 |
| | | | 261/DIG. 11 |
| 2016/0076822 A1* | 3/2016 | Pettitt | F28F 9/0273 |
| | | | 165/174 |
| 2022/0252351 A1* | 8/2022 | Yang | F28B 1/06 |

FOREIGN PATENT DOCUMENTS

| | | | |
|---|---|---|---|
| CN | 204854396 U | * | 12/2015 |
| CN | 205313129 U | | 6/2016 |
| CN | 207797255 U | | 8/2018 |
| CN | 108709341 A | | 10/2018 |
| CN | 109099725 A | * | 12/2018 |
| CN | 110319716 A | | 10/2019 |
| CN | 210242493 U | | 4/2020 |
| JP | S5366043 A | | 6/1978 |
| JP | 2003074994 A | | 3/2003 |
| JP | 2006502364 A | | 1/2006 |
| SU | 459653 A1 | | 4/1975 |

OTHER PUBLICATIONS

European Patent Office, European Search Report Issued in Application No. 20806554.0, Jun. 1, 2023, Germany, 6 pages.

* cited by examiner

FLASH CLOSED HEAT EXCHANGER

CROSS-REFERENCE

This application is the national phase of international application No. PCT/CN2020/085059, titled "FLASH CLOSED HEAT EXCHANGER", filed on Apr. 16, 2020, which claims the benefit of priorities to the following two Chinese patent applications, all of which are incorporated herein by reference,
1) Chinese Patent Application No. 201910407748.6, titled "CLOSED HEAT EXCHANGER", filed with the China National Intellectual Property Administration on May 16, 2019; and
2) Chinese Patent Application No. 201910663396.0, titled "FLASH CLOSED HEAT EXCHANGER", filed with the China National Intellectual Property Administration on Jul. 22, 2019.

FIELD

The present application relates to a heat exchanger, in particular to an enclosed flash-evaporation heat exchanger.

BACKGROUND

Heat exchanger is a kind of equipment for performing heat exchange between a cold medium and a hot medium, also referred to as heat interchanger. The heat exchanger plays a role in chemical, petroleum, power, food and many other industrial productions. In actual production, the heat exchanger may serve as a heater, a cooler, a condenser, an evaporator and a reboiler, etc., which is widely used.

An existing heat exchanger generally includes an open cavity provided with a heat exchanging coiler. A large amount of low-temperature outdoor natural wind enters the open cavity, absorbs heat from the heat exchanging coiler when flowing through the heat exchanging coiler, and becomes high-temperature air, and then is discharged out of the cavity, to refrigerate the medium in the heat exchanging coiler.

A problem with this conventional air-cooled heat exchanger is that the refrigeration effect of the heat exchanger is greatly affected by the external environment. In a case that the temperature and humidity of external natural wind is relatively low, a heat exchange efficiency between the natural wind and the heat exchanging coiler is relatively high, so that the heat exchanger has a better refrigeration effect; in a case that the temperature or humidity of the external natural wind is too high, the heat exchange efficiency between the natural wind and the heat exchanging coiler becomes poor, the refrigeration effect of the entire heat exchanger will be seriously affected, and the heat exchanger may even be unable to refrigerate.

In order to solve this problem, the existing heat exchanger has been improved. As shown in FIG. 1, a nozzle 2 is provided at an air inlet of the open cavity 1, and water sprayed from the nozzle 2 may lower the temperature of the natural wind around the nozzle; since the temperature of the natural wind entering the open cavity 1 is lowered, the heat exchange efficiency between the natural wind and a heat exchanging coiler 3 is improved. Therefore, the improved heat exchanger has a better refrigeration effect than the conventional heat exchanger.

However, the heat exchanging effect of the improved heat exchanger is still easily affected by the temperature and humidity of the external natural wind. In hot and humid areas, the refrigeration effect of this kind of heat exchanger is still poor, and the energy consumption thereof is very large, which is hard to meet the refrigeration demand.

SUMMARY

An enclosed flash-evaporation heat exchanger is provided according to the present application, where by promoting the transition of water from liquid to gas in an enclosed housing, heat is absorbed and cold capacity is released, so that the temperature in the enclosed housing is lowered, and a medium in the heat exchanging device is further cooled, or a medium in the enclosed housing is directly cooled. The solutions are as follows.

An enclosed flash-evaporation heat exchanger includes an enclosed housing, where a negative-pressure fan is provided on the enclosed housing, and the negative pressure fan is configured to form a negative-pressure environment inside the enclosed housing; a water atomization device is provided in the enclosed housing, the water atomization device is configured to spray atomized water into the enclosed housing for evaporating the atomized water into vapor in the negative-pressure environment.

Further, an exhaust amount of the negative-pressure fan is greater than an evaporation amount of the atomized water in the enclosed housing.

Further, a pressure of the negative-pressure environment in the enclosed housing is lower than an ambient atmospheric pressure by more than 20 Pa.

Further, the water atomization device is provided on one side of the enclosed housing, and the negative-pressure fan is provided on another side of the enclosed housing; a heat exchanging device is provided inside the enclosed housing, and the heat exchanging device is located between the water atomization device and the negative-pressure fan; a first static pressure chamber is formed between the negative-pressure fan and the heat exchanging device, a second static pressure chamber is formed between the water atomization device and the heat exchanging device, the negative-pressure fan is configured to form a negative-pressure environment in the second static pressure chamber, and the water atomization device is configured to spray the atomized water into the second static pressure chamber to evaporate the atomized water into vapor.

Further, a pressure of the second static pressure chamber is lower than the ambient atmospheric pressure by more than 20 Pa.

Further, a pressure regulating device is provided in the second static pressure chamber, and the pressure regulating device is configured to promote the flow of vapor in the enclosed housing.

Further, an air inlet of the pressure regulating device is arranged outside the enclosed housing, an air outlet of the pressure regulating device is arranged inside the enclosed housing, a regulating air flow enters the enclosed housing by means of the pressure regulating device to promote the flow of the vapor in the enclosed housing.

Further, the pressure regulating device is a tubular structure, one end of the tubular structure is an open end, another end of the tubular structure is a closed end; the open end of the tubular structure is located outside the enclosed housing, multiple air outlet holes are defined on a part of the tubular structure located inside the enclosed housing; the regulating air flow enters the enclosed housing through the open end and the air outlet holes of the tubular structure.

Further, the pressure regulating device is a fan.

Further, the fan is provided inside the enclosed housing.

Further, the heat exchanging device is a square structure, the water atomization device is provided on one side of the square structure, and the negative-pressure fan is correspondingly provided on the opposite side of the square structure.

Further, multiple heat exchanging devices are provided in the enclosed housing and spaced apart.

Further, the water atomization device is provided at a lower part of the enclosed housing, the negative-pressure fan is provided at an upper part of the enclosed housing; and the water atomization device sprays generated atomized water into the enclosed housing from bottom to top.

Further, the water atomization device is provided at an upper part of the enclosed housing, the negative-pressure fan is provided on a side wall of the enclosed housing, and the negative-pressure fan is provided near a lower part of the side wall of the enclosed housing; and the water atomization device sprays generated atomized water into the enclosed housing from top to bottom.

Further, the heat exchanging device is a V-shaped structure, the water atomization device is provided corresponding to two outer side surfaces of the V-shaped structure, and the negative-pressure fan is provided corresponding to a middle cavity of the V-shaped structure.

Further, the heat exchanging device is a cylindrical structure, the water atomization device is provided corresponding to an outer surface of the cylindrical structure, and the negative-pressure fan is provided corresponding to an internal cavity of the cylindrical structure.

Further, the heat exchanging device is a condenser.

Further, an air inlet pipe and an air outlet pipe are provided on the enclosed housing, the air outlet pipe is provided close to the negative-pressure fan, the air inlet pipe is provided away from the negative-pressure fan; the substance to be cooled enters the enclosed housing through the air inlet pipe, and is discharged out of the enclosed housing through the air outlet pipe.

The enclosed flash-evaporation heat exchanger provided according to the present application has the following embodiments:

(1), by promoting the evaporation of the atomized water in the closed negative-pressure environment, the overall temperature in the closed environment is lowered. The heat exchanging device can achieve the refrigeration effect through radiation in a low-temperature environment, which is not affected by the temperature and humidity of external natural wind, and can be used in various areas with different environments;

(2), since convection heat exchange with the external environment is not required in the refrigeration process, the enclosed flash-evaporation heat exchanger according to the present application has a small installed capacity, and the entire equipment occupies a small space, which is convenient for mounting and saves space;

(3), the enclosed flash-evaporation heat exchanger according to the present application realizes refrigeration completely through the evaporation of the atomized water. The process of water transforming from liquid to gas can release cold capacity for refrigeration, and the temperature of the vapor discharged by the equipment may not rise. Therefore, in the refrigeration process, there is actually no heat discharged into the atmosphere and heat island effect will not be formed.

The refrigeration system has a high refrigeration efficiency, and a stable and reliable refrigeration effect.

DETAILED DESCRIPTION OF THE EMBODIMENTS

In order to better understand the embodiments of the present application, the enclosed flash-evaporation heat exchanger provided according to the present application will be described in further detail below in conjunction with the accompanying drawings.

The enclosed flash-evaporation heat exchanger includes an enclosed housing, where a negative-pressure fan is provided on a side wall of the enclosed housing, and the negative-pressure fan is configure to maintain an environment inside the enclosed housing in a stable negative pressure state. A water atomization device is provided in the enclosed housing, the water atomization device is configured to convert the water into mist-like atomized water, the atomized water is dispersed in the negative pressure environment in the enclosed housing and quickly flash-evaporates into cold and humid vapor for releasing cold capacity, to lower the ambient temperature in the enclosed housing.

First Embodiment

Figure 1:
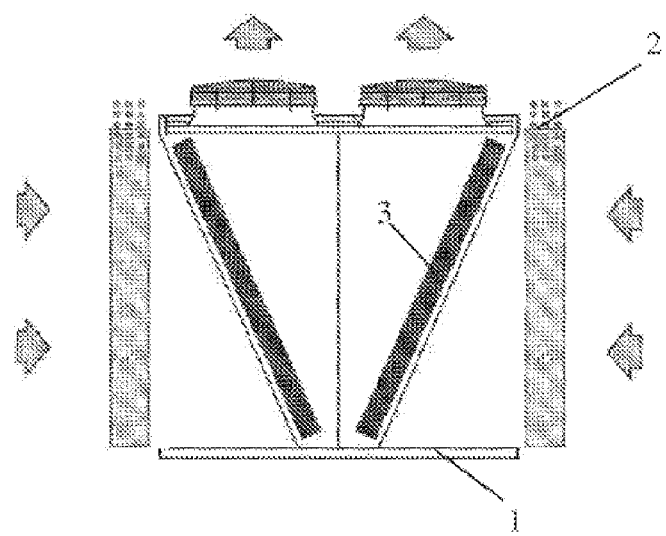
FIG. 1 is a schematic structural view of an existing heat exchanger.
Figure 2:
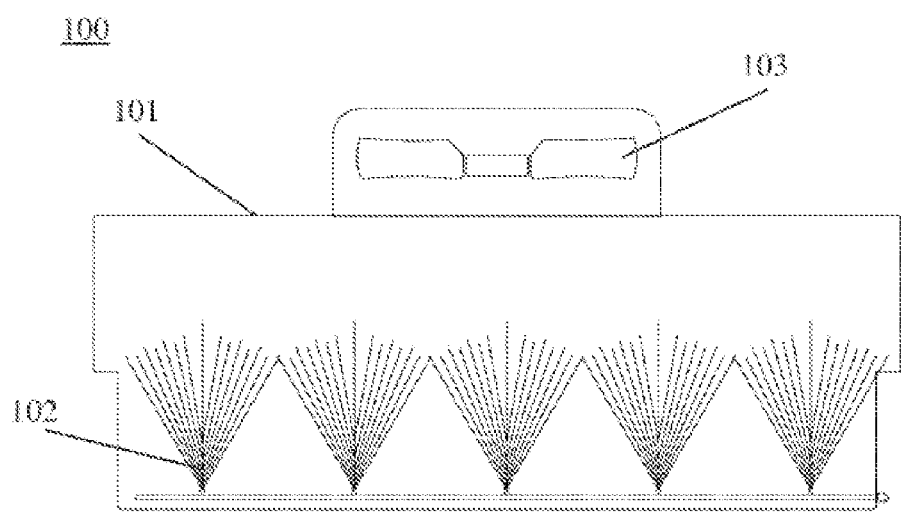
FIG. 2 is a schematic view of an internal structure of a first embodiment of an enclosed flash-evaporation heat exchanger provided according to the present application.

As shown in FIG. 2, in the first embodiment of the present application, the enclosed flash-evaporation heat exchanger includes an enclosed housing 101. The enclosed housing 101 is rectangular and defined by plates, and an accommodating chamber is formed therein. A water atomization device 102 is provided at the bottom of the accommodation chamber, to spray the generated atomized water into the accommodating chamber from bottom to top. A negative-pressure fan 103 is provided at the top of the accommodating chamber, to continuously discharge the gas in the enclosed housing 101 out of the enclosed housing 101, so that a uniform and stable negative pressure environment is formed in the accommodating chamber. In one embodiment, the exhaust amount of the negative-pressure fan 103 is greater than the evaporation amount of the atomized water in the enclosed housing 101. On one hand, the vapor in the enclosed housing 101 can be fully discharged, to improve the evaporation efficiency of the atomized water, and on the other hand, the negative-pressure environment in the enclosed housing 101 can be maintained.

The atomized water generated by the water atomization device 102 flash-evaporates quickly in the negative-pressure environment of the accommodating chamber, transforms from water-mist phase into vapor, and absorbs heat, lowering the ambient temperature in the enclosed housing 101. The vapor flash-evaporated from the atomized water can be discharged out of the enclosed housing 101 through the negative-pressure fan 103. Therefore, the atomized water in the accommodating chamber continuously evaporates into vapor and releases cold capacity. The vapor is continuously discharged out of the enclosed housing 101 through the negative-pressure fan 103 to complete refrigeration. The low-temperature environment in the enclosed housing 101 can be used to cool and lower the temperature of a substance.

In one embodiment, the water atomization device 102 includes a water supply pipeline, the water supply pipeline is arranged at the bottom of the enclosed housing 101, and is in communication with a water tank or a water pipe outside the enclosed housing 101, to continuously supply water into enclosed housing 101. The water supply pipeline may be a single linear pipeline, or two or more pipelines arranged side by side, or a single pipeline arranged in a coil shape. Multiple high-pressure atomizing nozzles are distributed on the water supply pipeline, and the water in the water supply pipeline can be sprayed through the multiple high-pressure atomizing nozzles to form mist-like atomized water, which is dispersed in the accommodating chamber. In one embodiment, the high-pressure atomizing nozzle may also be replaced with an ultrasonic atomizer to form atomized water.

Second Embodiment

Figure 3:
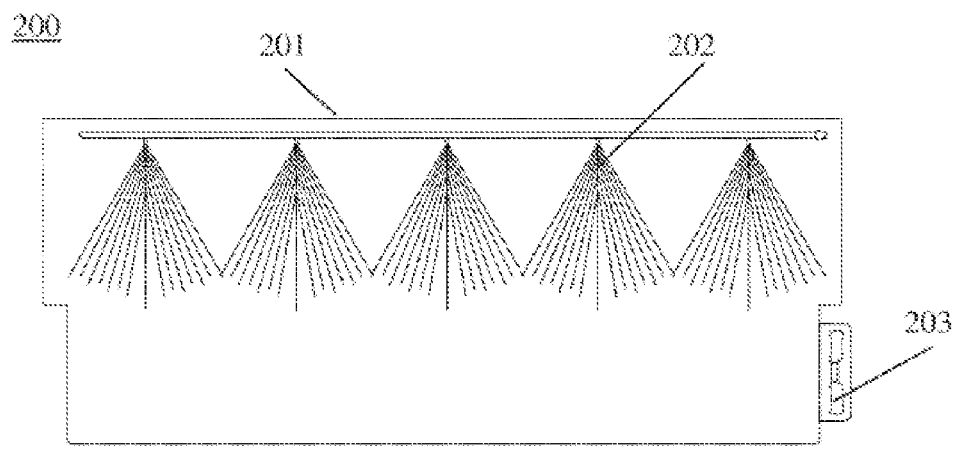
FIG. 3 is a schematic view of an internal structure of a second embodiment of an enclosed flash-evaporation heat exchanger provided according to the present application.

As shown in FIG. 3, in the second embodiment of the present application, the enclosed flash-evaporation heat exchanger includes an enclosed housing 201. The enclosed housing 201 is rectangular and defined by plates, and an accommodating chamber is formed therein. A water atomization device 202 is provided at the top of the accommodation chamber, to spray the atomized water into the accommodating chamber from top to bottom. A negative-pressure fan 203 is provided on a side wall of the enclosed housing 201 close to the bottom of the accommodating chamber, to continuously discharge the gas in the enclosed housing 201 out of the enclosed housing 201, so that a uniform and stable negative pressure environment is formed in the accommodating chamber. In one embodiment, the exhaust amount of the negative-pressure fan 203 is greater than the evaporation amount of the atomized water in the enclosed housing 201. On one hand, the vapor in the enclosed housing 201 can be fully discharged, to improve the evaporation efficiency of the atomized water, and on the other hand, the negative-pressure environment in the enclosed housing 201 can be maintained.

The water atomization device 202 includes a water supply pipeline, the water supply pipeline is arranged at the top of the enclosed housing 201, and is in communication with a water tank or a water pipe outside the enclosed housing 201, to continuously supply water into enclosed housing 201. Multiple high-pressure atomizing nozzles are distributed on the water supply pipeline, and the water in the water supply pipeline can be sprayed through the multiple high-pressure atomizing nozzles to form mist-like atomized water, which is dispersed in the accommodating chamber.

The atomized water generated by the water atomization device 202 flash-evaporates quickly in the negative-pressure environment of the accommodating chamber, transforms from water-mist phase into vapor, and absorbs heat, lowering the ambient temperature in the enclosed housing 201. The vapor flash-evaporated from the atomized water may be discharged out of the enclosed housing 201 by the negative-pressure fan 203.

Combining the contents of the first and second embodiments above, a basic cooling principle of the enclosed flash-evaporation heat exchanger provided according to the present application is as follows: in a closed environment, the water is promoted to evaporate from liquid to gas, to release cold capacity. The main factors promoting the evaporation of water are as follows: (1), the larger the surface area of water is, more easily the water evaporates; and (2) the greater the negative-pressure value of the environment is, more easily water molecules separate from each other to form vapor.

Based on the above cooling principle, the solutions for promoting the evaporation of water from liquid to gas are as follows.

Firstly, the water atomization device atomizes the water into small mist droplets, which greatly increases a surface area of the mist-droplet water and can accelerate the evaporation. In addition, the mist-droplet water moves actively and can float around in the enclosed housing, which accelerates the heat exchange and evaporation.

Secondly, the enclosed housing cooperates with the negative-pressure fan to keep the space in the enclosed housing always in a negative pressure environment, so that the pressure in the enclosed housing is lower than the ambient atmospheric pressure by more than 20 Pa. At this time, the water molecules on the surface of the already atomized small mist droplet are more likely to depart from the mist droplet body and transform into vapor. The ambient atmospheric pressure here refers to the ambient atmospheric pressure value of the working environment where the enclosed flash-evaporation heat exchanger is located.

Third Embodiment

In the third embodiment of the present application, the enclosed flash-evaporation heat exchanger includes an enclosed housing 301. A water atomization device 302 is provided on one side of the enclosed housing 301, and a negative-pressure fan 303 is provided on another side of the enclosed housing; a heat exchanging device is provided inside the enclosed housing 301, and the heat exchanging device is located between the water atomization device 302 and the negative-pressure fan 303; a first static pressure chamber is formed between the negative-pressure fan 303 and the heat exchanging device, a second static pressure chamber is formed between the water atomization device and the heat exchanging device, the negative-pressure fan 303 is configured to form a negative-pressure environment in the second static pressure chamber, and the water atomization device 302 is configured to spray the atomized water into the second static pressure chamber to evaporate the atomized water into vapor.

The basic cooling principle in the third embodiment is as follows: in a closed environment, the water is promoted to evaporate from liquid to gas, to release cold capacity. The main factors promoting the evaporation of water are as follows: (1), the larger the surface area of water is, more easily the water evaporates; (2) the greater the negative-pressure value of the environment is, more easily water molecules separate from each other to form vapor; and (3) the higher the temperature is, the faster the evaporation of water is.

Based on the above cooling principle, the solutions for promoting the evaporation of water from liquid to gas are as follows.

Firstly, the water atomization device atomizes the water into small mist droplets, which greatly increases a surface area of the mist-droplet water and can accelerate the evaporation. In addition, the mist-droplet water moves actively and can float around in the enclosed housing, which accelerates the heat exchange and evaporation.

Secondly, the enclosed housing cooperates with the negative-pressure fan, so that the second static pressure chamber and the first static pressure chamber in the enclosed housing always maintain a negative-pressure environment, and the pressure in the second static pressure chamber is lower than the ambient atmospheric pressure by more than 20 Pa. At this time, the water molecules on the surface of the atomized small mist droplet are more likely to depart from the mist droplet body and transform into vapor. The ambient atmospheric pressure here refers to the ambient atmospheric pressure value of the working environment where the enclosed flash-evaporation heat exchanger is located.

Thirdly, the high-temperature medium flowing into the heat exchanging device absorbs the cold capacity and release heat in the enclosed housing to complete the heat exchange. At this time, the heat exchanging device generates radiant heat. Therefore, when the mist droplets approach the heat exchanging device, the evaporation may be accelerated under the action of the radiant heat, and the heat of the high-temperature medium may be further absorbed to cool the high-temperature medium down.

In addition, when the small mist droplets that have not completely evaporated into vapor pass through the heat exchanging device, the small mist droplets can also exchange heat by directly contacting the heat exchanging device, to achieve the effect of auxiliary cooling and refrigeration. Since the volume of the water atomized into mist droplets becomes smaller, it is easier to disperse and float, which speeds up the fluidity of the mist droplets and can quickly complete heat exchange with the heat exchanging device. In addition, most of the mist droplets with small volume in the direct-contact heat exchange process absorb heat and evaporate into vapor, which greatly improves the refrigeration efficiency.

It should be particularly noted that, unlike the principle of existing air-cooled equipment, the housing used in the enclosed flash-evaporation heat exchanger according to the present application is closed, and the enclosed housing is configured to prevent outdoor wind from entering the housing, prevent excessive outdoor wind from entering the housing, and prevent the evaporation of atomized water in the enclosed housing from being affected. On the contrary, the existing air-cooled equipment exchanges heat and refrigerates by means of air flowing through the heat exchanging device in the equipment. Therefore, the larger the air amount entering the equipment, the better the refrigeration effect of the air-cooled equipment.

It should be supplemented that the enclosed housing in the present application is not equivalent to a completely sealed housing. In actual production, there may be gaps between plates or between plates and other components. When the negative-pressure fan exhausts outward, the air in the external environment may enter the enclosed housing through the gaps. Such small amount of air intake may not affect the overall negative-pressure environment in the enclosed housing. By regulating a rotation speed of the negative-pressure fan or by means of a pressure regulating device, the negative-pressure environment in the enclosed housing can be kept at a relatively stable pressure, which may not affect the evaporation effect of the atomized water, that is, may not affect the refrigeration effect of the equipment.

The enclosed flash-evaporation heat exchanger provided according to the present application promotes the evaporation of atomized water in a closed negative pressure environment, to achieve the refrigeration effect, which is not affected by the temperature and humidity of external natural wind, and can be used in various areas with different environments. The refrigeration efficiency is high, and the refrigeration effect is stable and reliable.

Figure 4:
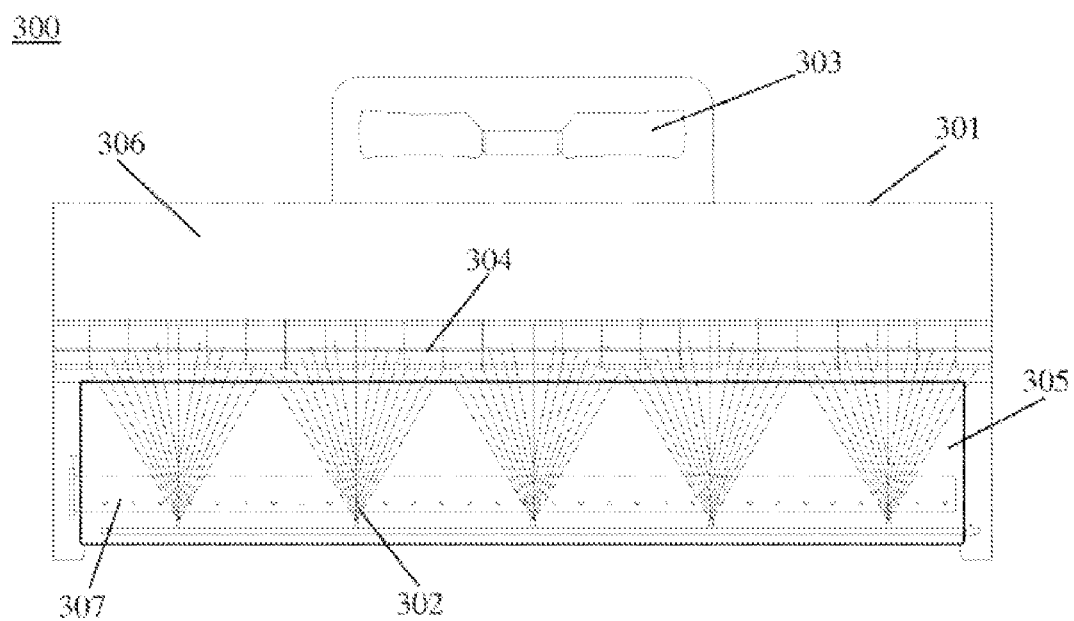
FIG. 4 is a schematic view of an internal structure of a third embodiment of an enclosed flash-evaporation heat exchanger provided according to the present application.

In one embodiment, as shown in FIG. 4, in the third embodiment of the present application, the enclosed flash-evaporation heat exchanger includes an enclosed housing 301. The enclosed housing 301 is rectangular and defined by plates, and an accommodating chamber is formed therein.

A water atomization device 302 is provided at the bottom of the accommodating chamber, a negative-pressure fan 303 is provided at the top of the accommodating chamber, and a heat exchanging device 304 is provided in the middle of the accommodating chamber. The heat exchanging device 304 is arranged between the water atomization device 302 and the negative-pressure fan 303. In this embodiment, the heat exchanging device 304 may be a square-shaped coil pipe condenser. In one embodiment, the heat exchanging device may also be other existing heat exchangers, which is not limited to a condenser.

A second static pressure chamber 305 is formed between the heat exchanging device 304 and the water atomization device 302, and a first static pressure chamber 306 is formed between the heat exchanging device 304 and the negative-pressure fan 303. The negative-pressure fan 303 continuously discharges the gas in the enclosed housing 301 out of the enclosed housing 301, so that a uniform and stable negative-pressure environment is formed in the second static pressure chamber 305 and the first static pressure chamber 306. In one embodiment, the exhaust amount of the negative-pressure fan 303 is greater than the evaporation amount of the atomized water in the enclosed housing 301. On one hand, the vapor in the enclosed housing 301 can be fully discharged, to improve the evaporation efficiency of the atomized water, and on the other hand, the negative-pressure environment in the enclosed housing 301 can be maintained.

The water atomization device 302 sprays the atomized water into the second static pressure chamber 305, and the atomized water quickly evaporates in the negative-pressure environment of the second static pressure chamber 305, transforms from water-mist phase into vapor and absorbs heat, which lowers the ambient temperature in the enclosed housing 301. The high-temperature medium in the heat exchanging device 304 absorbs cold capacity when passing through the low-temperature environment in the enclosed housing 301, which lowers the temperature of the high-temperature medium.

Since it is also a negative-pressure environment in the first static pressure chamber 306, the vapor evaporated in the second static pressure chamber 305 may enter the first static pressure chamber 306 through the heat exchanging device 304, and then be discharged out of the enclosed housing 301 through the negative-pressure fan 303. Thus, the atomized water in the second static pressure chamber 305 continuously evaporates into vapor, and releases cold capacity, and the vapor is continuously discharged out of the enclosed housing 301 through the negative-pressure fan 303 to complete refrigeration.

In one embodiment, the water atomization device 302 includes a water supply pipeline, the water supply pipeline is arranged at the bottom of the second static pressure chamber 305, and is in communication with a water tank or a water pipe outside the enclosed housing 301, to continuously supply water into enclosed housing 301. The water supply pipeline may be a single linear pipeline, or two or more pipelines arranged side by side, or a single pipeline arranged in a coil shape. Multiple high-pressure atomizing nozzles are distributed on the water supply pipeline, and the water in the water supply pipeline can be sprayed through the multiple high-pressure atomizing nozzles to form mist-like atomized water, which is dispersed in the second static pressure chamber 305. In one embodiment, the multiple high-pressure atomizing nozzles are arranged toward a direction where the heat exchanging device 304 is located, so that the atomized water can be better sprayed to the heat exchanging device 304. In one embodiment, the high-pressure atomizing nozzle may also be replaced with an ultrasonic atomizer to form atomized water.

Further, a pressure regulating device 307 is provided in the second static pressure chamber 305, and the pressure regulating device 307 is configured to promote the flow of vapor in the enclosed housing 301. In one embodiment, the pressure regulating device 307 includes a slender pipe, which is arranged close to the water atomization device 302. A first end of the pipe is a closed end, which extends into the second static pressure chamber 305. A second end of the pipe is an open end, which is located outside the enclosed housing 301. In a portion of the pipe located inside the second static pressure chamber 305, multiple air outlets are distributed on a pipe wall. While the enclosed flash-evaporation heat exchanger is working, a small amount of outdoor air can enter the pipe through the second end of the pipe, and blow to the water atomization device 302 through the multiple air outlets, to accelerate the flow of the atomized water and the vapor in the second static pressure chamber 305 and promote the evaporation of the atomized water and the discharge of the vapor.

A sealing cover is provided at the open end of the second end of the pipe. When there is no need to promote the flow of the atomized water and the vapor in the second static pressure chamber 305, the sealing cover may be added to block entry of air, and the pressure regulating device 307 is closed. Besides, the sealing degree of the sealing cover may be adjusted, to control the entry amount of air, thus adjusting the flow degree of the atomized water and the vapor in the second static pressure chamber 305.

Figure 5:
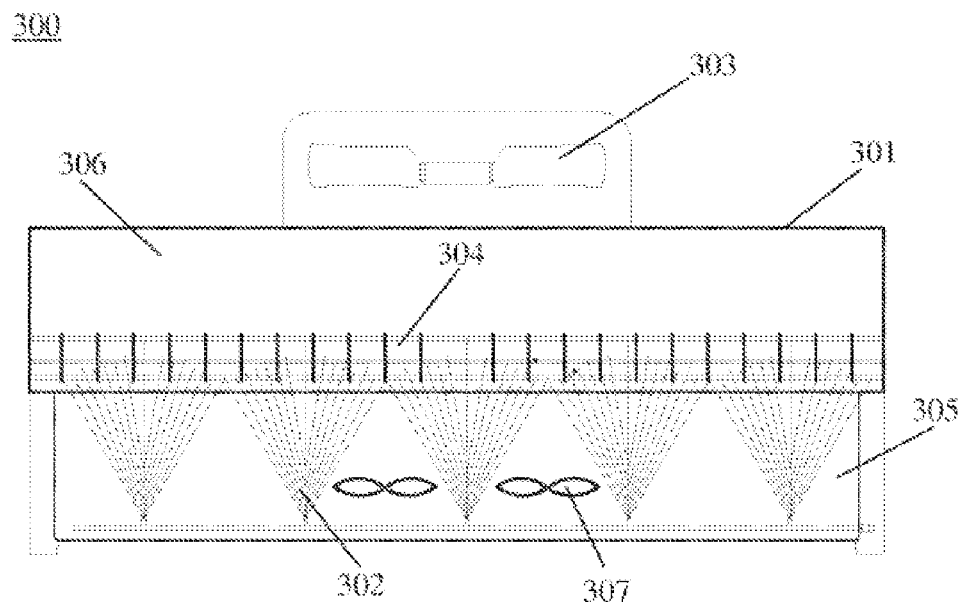
FIG. 5 is another schematic view of the internal structure of the third embodiment of the enclosed flash-evaporation heat exchanger provided according to the present application.

In addition, as shown in FIG. 5, the pressure regulating device may be one or more fans, the one or more fans are arranged close to the water atomization device 302, and the rotation of the one or more fans promotes the flow of the vapor and the atomized water in the enclosed housing 301.

It should be supplemented that, based on the above basic refrigeration principle of the enclosed flash-evaporation heat exchanger according to the present application, the enclosed housing in the present application is required to restrain natural wind from entering into the housing, which does not conflict with the pressure regulating device in the present application. Firstly, though the pressure regulating device allows the external natural wind to enter the enclosed housing, an amount of the entry air is very small, which is similar to the above natural wind entering through the gap between plates of the housing, and will not affect the normal operation of the device; secondly, the pressure regulating device is arranged to promote the flow of the atomized water and the vapor after the water evaporation through the movement of micro air flow, which accelerates the vapor moving from the second static pressure chamber to the first static pressure chamber and promotes the discharge of the vapor on one hand, and promotes the evaporation of the atomized water on the other hand. In other words, the small amount of natural wind entering the enclosed housing through the pressure regulating device cannot achieve the effect of cooling the heat exchanging device, which is different from the existing air-cooled equipment.

A refrigeration method based on enclosed flash-evaporation heat exchanger is further provided according to the present application, which includes the following steps: the low-temperature atomized water droplets sprayed from the nozzles of the water atomization device 302 gradually and successively drift from an aerosol area (the second static pressure chamber 305 in FIG. 4) to a heat exchanging area and a high negative pressure space area (the first static pressure chamber 306 in FIG. 4) under the action of the negative-pressure fan 303 until the droplets are discharged out of the heat exchanging device 304. During the entire drift process, every small water droplet continuously absorbs the heat radiated by the heat exchanging device 304, and water molecules on the surface of the small water droplet escape from an internal force of the small water droplet to form gaseous water molecules under the dual action of negative pressure and radiation; the heat in the heating device 304 is continuously carried out by atomized water supplied continuously to cool down a cooling medium in the heat exchanging device 304. Water vapor and yet-evaporated water droplets are discharged out of the enclosed housing 301 under the action of negative pressure. A high negative pressure area is formed at a part of the chamber formed by the enclosed housing 301, close to the negative-pressure fan 303, which continuously discharges the water vapor inside the chamber out of the enclosed housing 301; a part of the chamber formed by the enclosed housing 301, where the heat exchanging device 304 is provided, is the heat exchanging area; a part of the chamber formed by the enclosed housing 301, close to the water atomization device 302, is the aerosol area. Macroscopically, in a process that the water droplets move from bottom to top in the chamber, under the action of negative pressure, water molecules on the surface of the water droplets continuously dissipate the heat in the heat exchanging device 304 by absorbing heat through non-boiling phase change evaporation, to cool down the medium in the heat exchanging device 304.

The pressure regulating device 307 is provided close to the water atomization device 302. The gas introduced through the pressure regulating device 307 and the water mist dispersed and suspended in the chamber of the enclosed housing 301 in a negative pressure environment form an aerosol. The heat exchanging device 304 performs radiant heat exchange with the water mist, and the water mist performs a non-boiling phase change to dissipate the heat, and the water vapor and the yet-evaporated water mist are directly discharged into the atmosphere.

As an example, an inner wall of the enclosed housing 301 and/or a surface of the heat exchanging device 304 are coated with a water-repellent agent, which is a pollution-free and harmless super-hydrophobic material, and is configured to prevent huge water droplets formed by collision and combination of the sprayed-out small water droplets from attaching to the inner wall of the enclosed housing 301 and the surface of the heat exchanging device 304, to prevent the water droplets from hanging on the wall and prevent the heat exchanging efficiency from being affected. The small water droplets suspended in the aerosol area perform a sufficient radiant heat exchange with the heat exchanging device 304 for a longer period of time. The negative-pressure fan 303 may be embodied as a magnetic levitation negative-pressure fan, which adopts technology such as a magnetic suspension bearing, a high-speed permanent magnet synchronous motor, a high-efficiency frequency converter speed regulation and etc. During start-up, the magnetic levitation negative-pressure fan rotates after being suspended. There is no friction, so no lubrication is required. An existing magnetic levitation negative-pressure fan structure may be adopted, and the structure may not be described. The magnetic levitation negative-pressure fan creates a lower negative pressure environment inside the relatively enclosed housing 301, and strengthens the generalized evaporation and heat exchanging amount of the small water droplets. The rotation speed of the fan may be increased in the magnetic levitation fan, so that the negative pressure in the enclosed housing 301 is higher, and greater cooling efficiency is obtained. The water atomization device 302 has a first cooling function after spraying the water mist out. Therefore, the water may be adopted directly under different temperature conditions and humidity conditions, and there is no need to process the water to meet the usage requirements, further reducing the cost.

The water atomization device 302 may be embodied as a high-pressure pump atomizer, and high-pressure water generated by the high-pressure water pump is atomized at a nozzle; or, the water atomization device 302 may be embodied as a compressed air atomizer; the nozzle is connected to an air compressor through an air compressor port, and is connected to a water storage device through a water inlet; the water is atomized under the action of the high-pressure gas generated by the air compressor; or, the water atomization device 302 may be embodied as an ultrasonic atomizer, which includes an ultrasonic atomization sheet, and the ultrasonic atomization sheet cooperates with ultrasonic waves to atomize the water.

Fourth Embodiment

Figure 6:
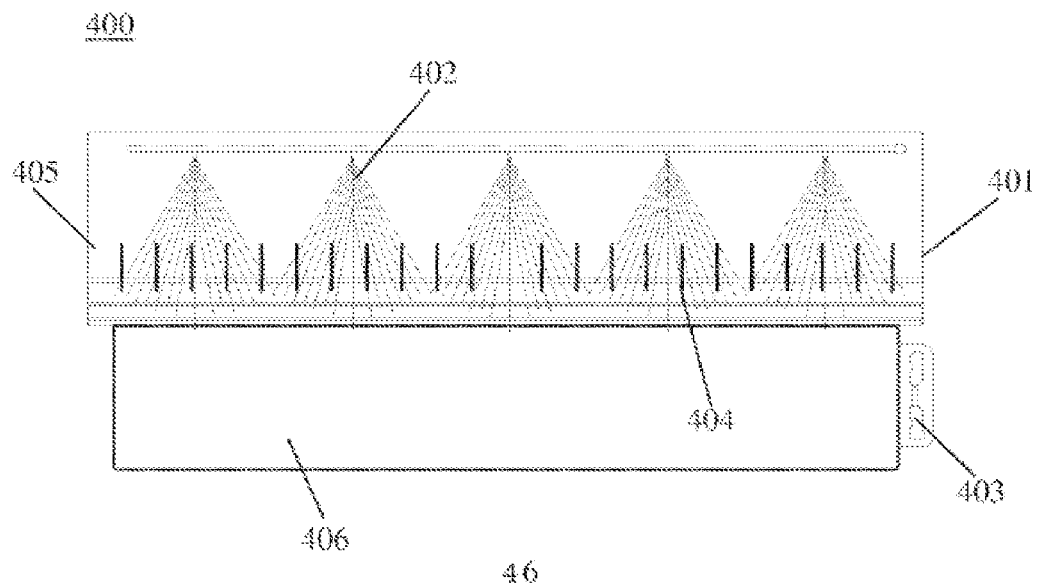
FIG. 6 is a schematic view of an internal structure of a fourth embodiment of an enclosed flash-evaporation heat exchanger provided according to the present application.

As shown in FIG. 6, in the fourth embodiment of the present application, the enclosed flash-evaporation heat exchanger includes an enclosed housing 401. The enclosed housing 401 is rectangular and defined by plates, and an accommodating chamber is formed therein. A water atomization device 402 is provided at the top of the accommodating chamber, a negative-pressure fan 403 is provided on a side wall of the enclosed housing 401 close to the bottom of the accommodating chamber, and a heat exchanging device is provided in the middle of the accommodating chamber. The heat exchanging device is arranged between the water atomization device 402 and the negative-pressure fan 403.

A second static pressure chamber is formed between the heat exchanging device and the water atomization device 402, and a first static pressure chamber is formed between the heat exchanging device and the negative-pressure fan 403. The negative-pressure fan 403 continuously discharges the gas in the enclosed housing 401 out of the enclosed housing 401, so that a uniform and stable negative-pressure environment is formed in the second static pressure chamber and the first static pressure chamber.

The water atomization device 402 sprays the atomized water into the second static pressure chamber, and the atomized water quickly evaporates in the negative-pressure environment of the second static pressure chamber, transforms from water-mist phase into vapor and absorbs heat, which lowers the ambient temperature in the enclosed housing 401. The high-temperature medium in the heat exchanging device absorbs cold capacity when passing through the low-temperature environment in the enclosed housing 401, which lowers the temperature of the high-temperature medium.

The vapor evaporated in the second static pressure chamber may enter the first static pressure chamber through the heat exchanging device, and then be discharged out of the enclosed housing 401 through the negative-pressure fan 403. The water that is not completely evaporated or not fully atomized into mist droplets flows into the bottom of the first static pressure chamber after flowing through the heat exchanging device. A water recycle pipeline is provided at the bottom of the first static pressure chamber. The water accumulated at the bottom of the first static pressure chamber may be discharged out of the first static pressure chamber through the water recycle pipeline. Thus, the atomized water in the second static pressure chamber continuously evaporates into vapor, and releases cold capacity, and the vapor is continuously discharged out of the enclosed housing 401 through the negative-pressure fan 403 to complete refrigeration.

In one embodiment, the water recycle pipeline is in communication with the water atomization device 402, and the water discharged through the water recycle pipeline may be atomized again through the water atomization device 402 after being recycled.

In one embodiment, the water atomization device 402 includes a water supply pipeline, the water supply pipeline is arranged at the top of the second static pressure chamber, and is in communication with a water tank or a water pipe outside the enclosed housing 401, to continuously supply water into enclosed housing 401. Multiple high-pressure atomizing nozzles are distributed on the water supply pipeline, and the water in the water supply pipeline can be sprayed through the multiple high-pressure atomizing nozzles to form mist-like atomized water, which is dispersed in the second static pressure chamber.

Fifth Embodiment

Figure 7:
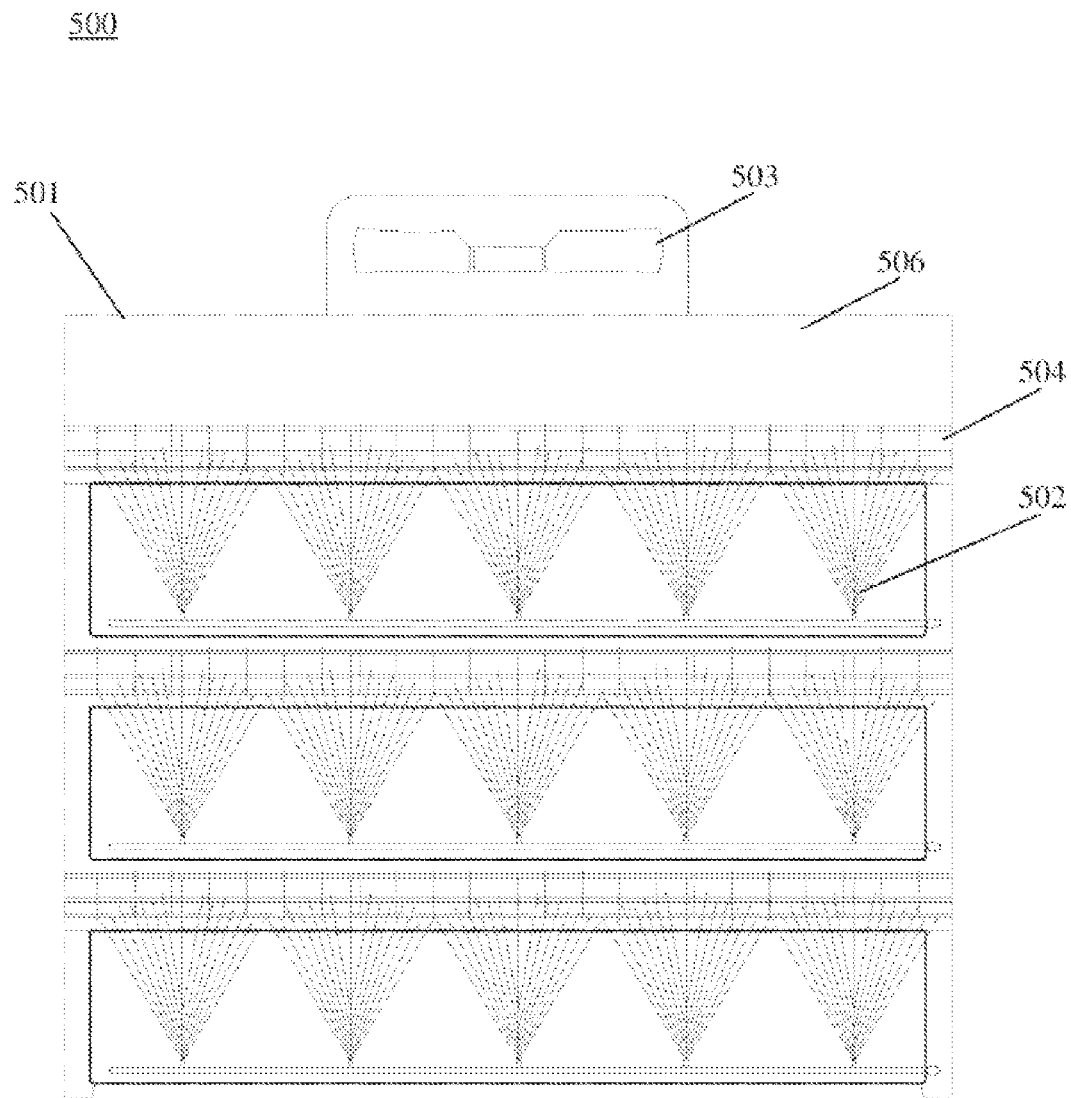
FIG. 7 is a schematic view of an internal structure of a fifth embodiment of an enclosed flash-evaporation heat exchanger provided according to the present application.

As shown in FIG. 7, the difference from the third embodiment is that, in the fifth embodiment, a heat exchanging device 504 in an enclosed housing 501 includes three groups. Three groups of the heat exchanging devices 504 are provided up and down and spaced apart. A water atomization device 502 is correspondingly provided below each group of the heat exchanging devices 504. A negative-pressure fan 503 is provided at the top of the enclosed housing 501, and a first static pressure chamber 506 is formed between the uppermost heat exchanging device 504 and the enclosed housing 501. A negative pressure environment is respectively formed between each of the three groups of the heat exchanging devices 504 and a corresponding water atomization device 502 by the rotation of the negative-pressure fan 503, to promote the phase change of the atomized water into vapor. The vapor passes through the heat exchanging devices 504 and enters the first static pressure chamber 506, and is discharged out of the enclosed housing 501 by the negative-pressure fan 503.

In one embodiment, the heat exchanging devices 504 in the fifth embodiment may also be provided in two or more groups arranged up and down and spaced apart.

Sixth Embodiment

Figure 8:
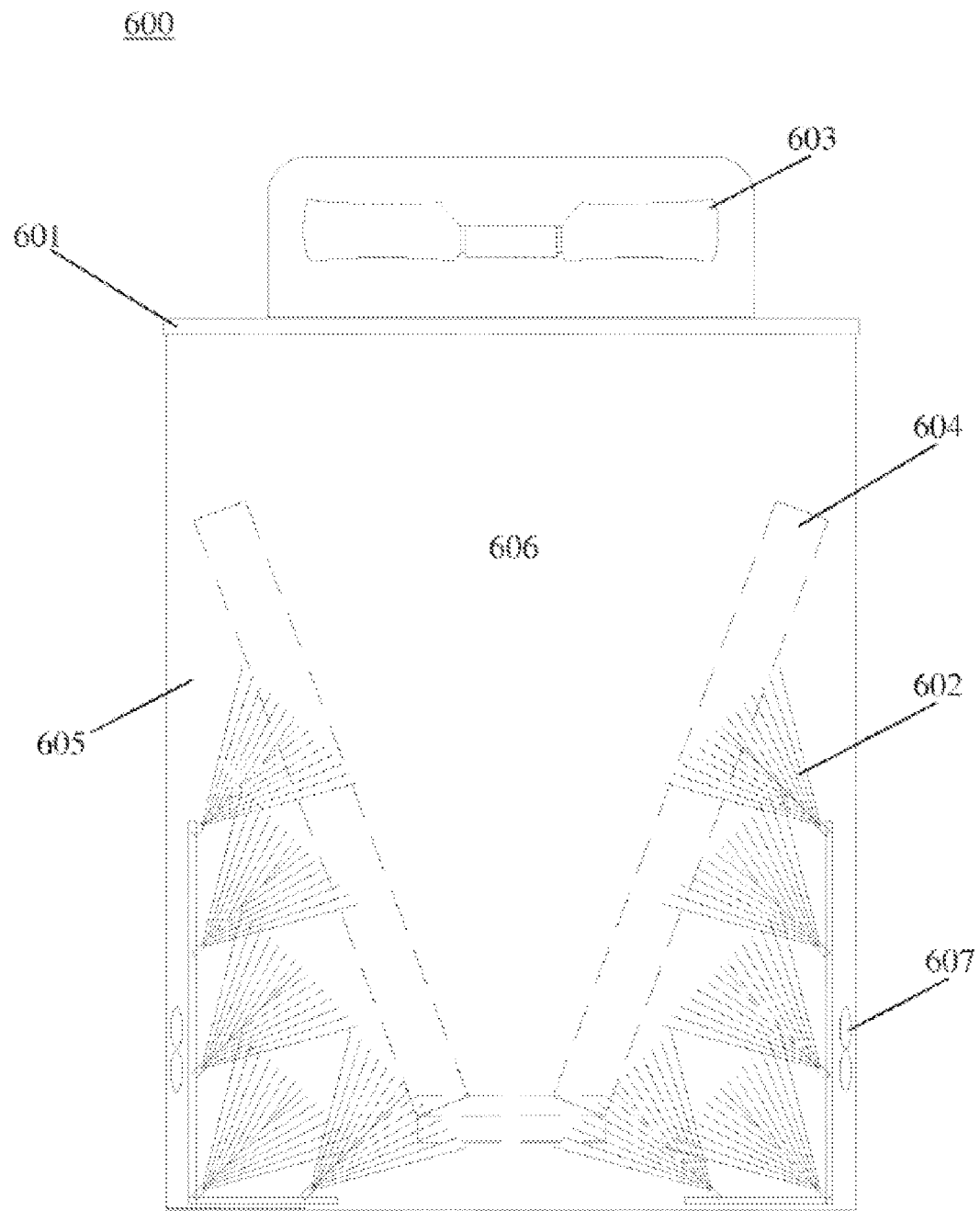
FIG. 8 is a schematic view of an internal structure of a sixth embodiment of an enclosed flash-evaporation heat exchanger provided according to the present application.

As shown in FIG. 8, the difference from the third embodiment is that, in the sixth embodiment, a heat exchanging device 604 in an enclosed housing 601 is provided in a V shape, and a negative-pressure fan 603 is provided at a V-shaped opening of the V-shaped heat exchanging device 604, facing toward the top of the enclosed housing 601.

A water atomization device 602 is provided on inner surfaces of the enclosed housing 601, close to two sides of the V-shaped heat exchanging device 604, and another water atomization device 602 is further provided at the bottom of the enclosed housing 601. A second static pressure chamber 605 is formed between the water atomization device 602 and the V-shaped heat exchanging device 604, and a first static pressure chamber 606 is formed between a middle part of the V-shaped heat exchanging device 604 and the negative-pressure fan 603.

The negative-pressure fan 603 rotates to respectively form a negative pressure environment in the second static pressure chamber 605 and the first static pressure chamber 606 inside the enclosed housing 601. The water atomization device 602 sprays the atomized water to the V-shaped heat exchanging device 604 through a high-pressure atomizing nozzle, and the atomized water evaporates into vapor in the second static pressure chamber 605. The vapor flows into the first static pressure chamber 606 through the heat exchanging device 604, and is discharged out of the enclosed housing 601 by the negative-pressure fan 603.

A pressure regulating device 607 is further provided on the enclosed housing 601 close to the water atomization device 602. The pressure regulating device 607 includes two fans symmetrically provided on two sides of the V-shaped heat exchanging device 604, and the fans are located beside the water atomization device 602, and the fans rotate to promote the flow of vapor and atomized water in the enclosed housing 601. In one embodiment, the fans may also be directly provided on the water atomization device 602, and the number of the provided fans may also be one or more.

The fans may be fixedly provided on the inner side wall of the enclosed housing 601, and completely located inside the enclosed housing 601; or a small round hole may be defined on the side wall of the enclosed housing 601, and the fans may be provided in the small round hole, so that a small amount of external natural wind may enter the enclosed housing 601 through the fans to promote the flow of vapor and atomized water.

The V-shaped heat exchanging device 604 has a larger surface area, and the evaporation efficiency of the atomized water is higher, so that the overall refrigeration effect of the enclosed flash-evaporation heat exchanger is better.

Seventh Embodiment

Figure 9:
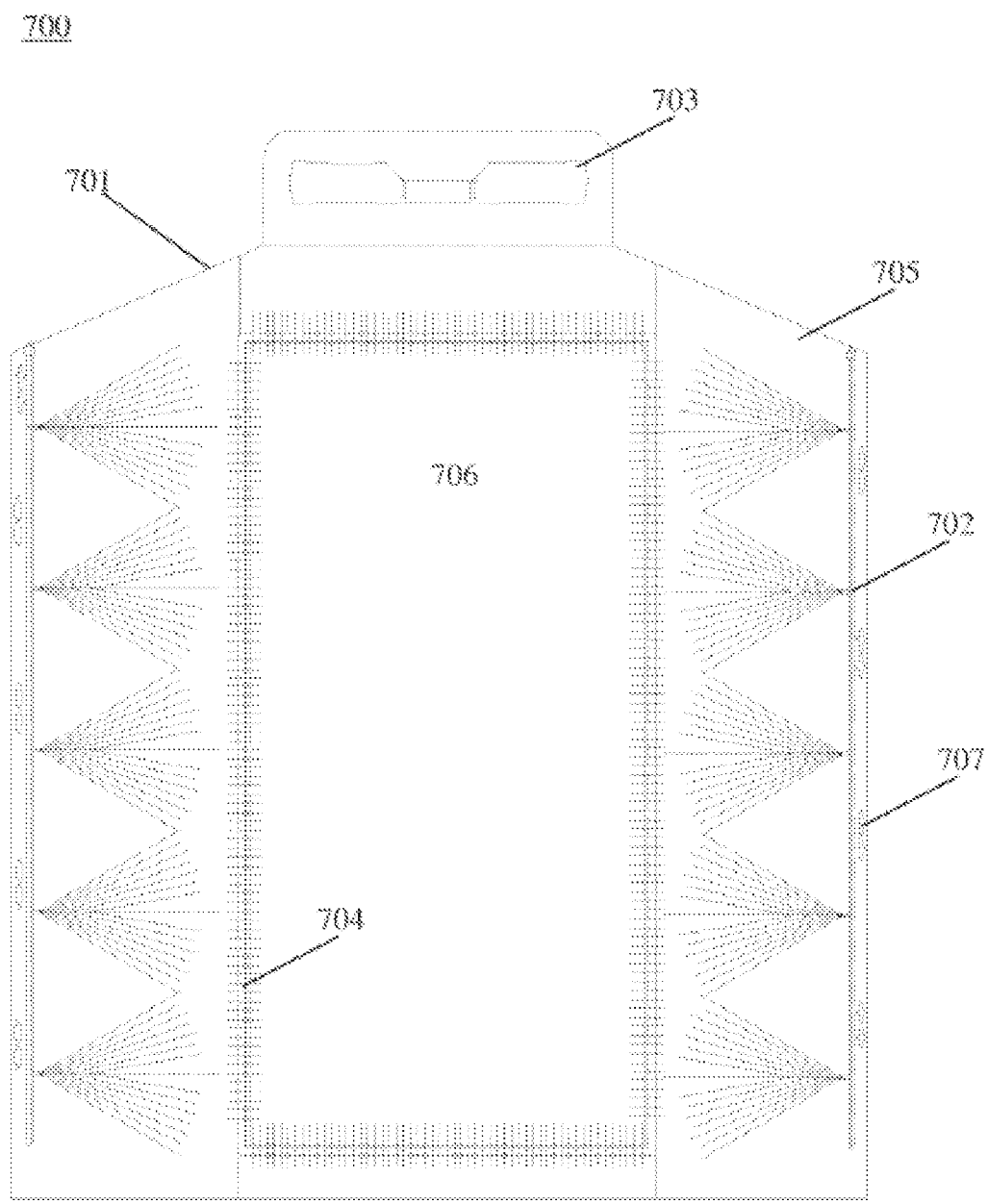
FIG. 9 is a side cross-sectional view of a seventh embodiment of an enclosed flash-evaporation heat exchanger provided according to the present application.
Figure 10:
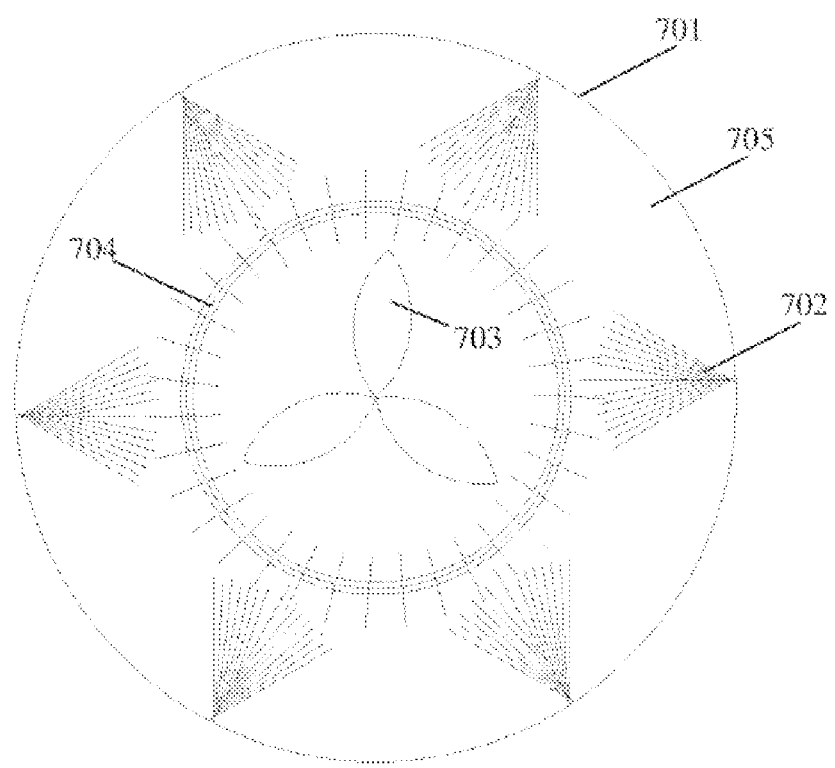
FIG. 10 is a top cross-sectional view of the seventh embodiment of the enclosed flash-evaporation heat exchanger provided according to the present application.

As shown in FIG. 9 and FIG. 10, the difference from the third embodiment is that, in the seventh embodiment, an enclosed housing 701 is cylindrical as a whole, and an accommodating chamber formed in the enclosed housing 701 is also cylindrical. A heat exchanging device 704 is provided in the middle of the accommodating chamber, and the heat exchanging device 704 is a hollow cylindrical structure as a whole. A water atomization device 702 is provided on a side wall of the enclosed housing 701. The water atomization device 702 includes water supply pipelines evenly distributed on the entire side wall of the enclosed housing 701. Multiple high-pressure atomizing nozzles are scattered on the water supply pipelines.

A second static pressure chamber 705 is formed between the water atomization device 702 and the cylindrical heat exchanging device 704, and a first static pressure chamber 706 is formed at the hollow structure in the middle of the cylindrical heat exchanging device 704. A negative-pressure fan 703 is provided at the top of the enclosed housing 701, and the negative-pressure fan 703 is in direct communication with the first static pressure chamber 706.

The negative-pressure fan 703 rotates to respectively form a negative pressure environment in the second static pressure chamber 705 and the first static pressure chamber 706 inside the enclosed housing 701. The water atomization device 702 sprays the atomized water to the cylindrical heat exchanging device 704 through the high-pressure atomizing nozzles, and the atomized water evaporates into vapor in the second static pressure chamber 705. The vapor flows into the first static pressure chamber 706 through the heat exchanging device 704, and is discharged out of the enclosed housing 701 by the negative-pressure fan 703.

A pressure regulating device 707 is further provided on the enclosed housing 701 close to the water atomization device 702. The pressure regulating device 707 includes multiple fans scattered on an inner side of the side wall of the enclosed housing 701. The fans rotate to promote the flow of vapor and atomized water in the enclosed housing 701. In one embodiment, the fans may also be directly provided on the water atomization device 702, and the number of the fans may be adaptively adjusted according to the size of the enclosed housing 701.

The fans may be fixedly provided on the inner side wall of the enclosed housing 701, and completely located inside the enclosed housing 701; or a small round hole may be defined on the side wall of the enclosed housing 701, and the fans may be provided in the small round hole, so that a small amount of external natural wind may enter the enclosed housing 701 through the fans to promote the flow of vapor and atomized water.

The cylindrical heat exchanging device 704 has a larger surface area, the atomized water generated by the water atomization device 702 is dispersed at the entire surface of the cylindrical heat exchanging device 704, so that evaporation efficiency of the atomized water is higher, to improve the overall refrigeration effect of the enclosed flash-evaporation heat exchanger.

Eighth Embodiment

The difference from the third to the seventh embodiment is that, in the eighth embodiment, the enclosed flash-evaporation heat exchanger provided according to the present application is capable of directly cooling down the substance to be cooled by adopting a low-temperature environment in an enclosed space, without the need to transfer temperature through a heat exchanging device or a heat exchanging medium.

Figure 11:
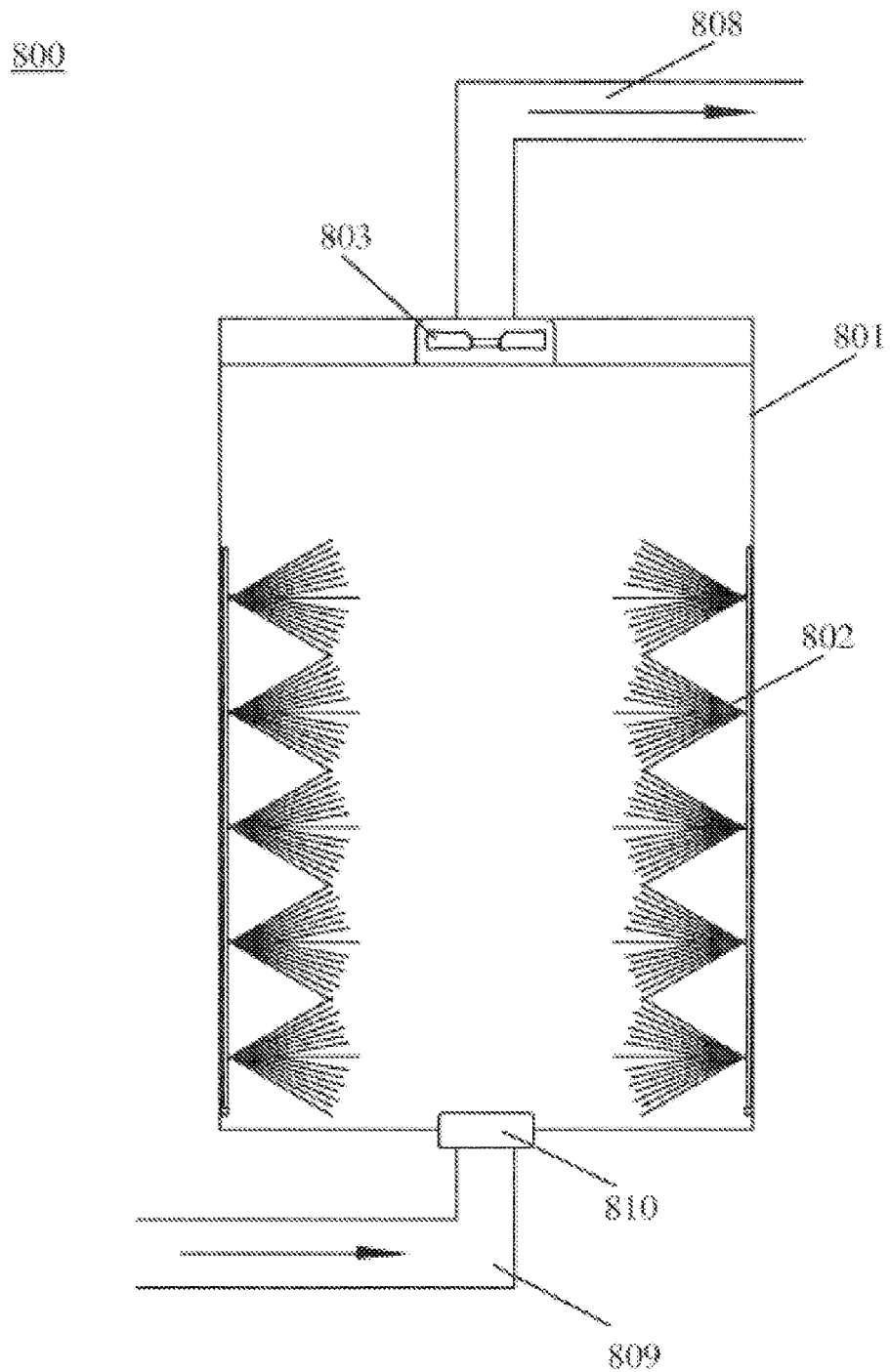
FIG. 11 is a schematic view of an internal structure of an eighth embodiment of an enclosed flash-evaporation heat exchanger provided according to the present application.

In one embodiment, as shown in FIG. 11, the enclosed flash-evaporation heat exchanger includes an enclosed housing 801; an accommodating chamber is formed in the enclosed housing 801; a water atomization device 802 is provided in the accommodating chamber, and the water atomization device 802 is provided on a side wall of the enclosed housing 801 to spray the atomized water to the center of the accommodating chamber, so that sufficient small mist droplets are dispersed in the accommodating chamber of the enclosed housing 801.

Further, the water atomization device 802 includes a water supply pipeline, the water supply pipeline is arranged on the side wall of the enclosed housing 801, and is in communication with a water tank or a water pipe outside the enclosed housing 801, to continuously supply water into enclosed housing 801. The water supply pipeline may be a single linear pipeline, or two or more pipelines arranged side by side, or a single pipeline arranged in a coil shape. Multiple high-pressure atomizing nozzles are distributed on the water supply pipeline, and the water in the water supply pipeline can be sprayed through the multiple high-pressure atomizing nozzles to form mist-like atomized water. In one embodiment, the high-pressure atomizing nozzle may also be replaced with an ultrasonic atomizer to form atomized water.

Furthermore, a negative-pressure fan 803 is provided at an upper part of the enclosed housing 801. One side of the negative-pressure fan 803 is in communication with the accommodating chamber of the enclosed housing 801, and another side of the negative-pressure fan 803 is in communication with an air outlet pipe 808. The gas in the enclosed housing 801 is continuously discharged out by the negative-pressure fan 803 through the air outlet pipe 808, to maintain a stable negative pressure environment in the enclosed housing 801. The negative pressure environment may promote the evaporation of atomized water into vapor to release cold capacity. An air inlet pipe 809 is in communication with a lower part of the enclosed housing 801, and a valve 810 is provided at a junction between the air inlet pipe 809 and the enclosed housing 801. The valve 810 is configured to control an air inlet amount of the air inlet pipe 809, so that the air inlet amount of the air inlet pipe 809 is less than an air outlet amount of the air outlet pipe 808, to maintain a stable negative pressure environment in the enclosed housing 801.

In one embodiment, an exhaust amount of the negative-pressure fan 803 is greater than an evaporation amount of the atomized water in the enclosed housing 801; and a pressure in the enclosed housing 801 is lower than an ambient atmospheric pressure by more than 20 Pa.

The enclosed flash-evaporation heat exchanger is used to cool the indoor air by way of example. The water atomization device 802 sprays atomized water into the enclosed housing 801, and the negative-pressure fan 803 maintains a negative pressure environment in the enclosed housing 801 to promote water to transform from liquid to gas for releasing cold capacity and lowering the temperature in the enclosed housing 801. The air inlet pipe 809 and the air outlet pipe 808 are both in communication with the indoor environment. The indoor air enters the enclosed housing 801 through the air inlet pipe 809, is cooled down in the low temperature environment in the enclosed housing 801, and is discharged back to the room through the air outlet pipe 808 under the rotation of the negative-pressure fan 803, to cool down the indoor environment. In one embodiment, other substances that need to be cooled may be supplied to the air inlet pipe 809 and the air outlet pipe 808.

The enclosed flash-evaporation heat exchanger provided according to the present application has the following embodiments:

(1), by promoting the evaporation of the atomized water in the closed negative-pressure environment, the overall temperature in the closed environment is lowered. The heat exchanging device can achieve the refrigeration effect through radiation in a low-temperature environment, which is not affected by the temperature and humidity of external natural wind, and can be used in various areas with different environments;

(2), since convection heat exchange with the external environment is not required in the refrigeration process, the enclosed flash-evaporation heat exchanger according to the present application has a small installed capacity, and the entire equipment occupies a small space, which is convenient for mounting and saves space; and (3), the enclosed flash-evaporation heat exchanger according to the present application realizes refrigeration completely through the evaporation of the atomized water. The process of water transforming from liquid to gas can release cold capacity for refrigeration, and the temperature of the vapor discharged by the equipment may not rise. Therefore, in the refrigeration process, there is actually no heat discharged into the atmosphere and heat island effect will not be formed. The refrigeration system has a high refrigeration efficiency, and a stable and reliable refrigeration effect.

The present application has been further described above with reference to the embodiments, but it should be understood that the description here should not be construed as a limitation on the scope of the present application.

The invention claimed is:

1. An enclosed flash-evaporation heat exchanger, comprising:
an enclosed housing to prevent an outdoor air from entering the enclosed housing, wherein a negative-pressure fan is provided on the enclosed housing, and the negative pressure fan is configured to form a negative-pressure environment inside the enclosed housing,
wherein a water atomization device is provided on one side of the enclosed housing, and the negative-pressure fan is provided on another side of the enclosed housing; a heat exchanging device is provided inside the enclosed housing, a high-temperature medium is flowing through the heat exchanging device to be cooled and the heat exchanging device is located between the water atomization device and the negative-pressure fan; a first static pressure chamber is formed between the negative-pressure fan and the heat exchanging device, a second static pressure chamber is formed between the water atomization device and the heat exchanging device, a negative-pressure environment in the second static pressure chamber is formed by the negative-pressure fan, and the water atomization device is arranged toward a direction where the heat exchanging device is located and is configured to spray a atomized water into the second static pressure chamber to evaporate the atomized water into a vapor to cool the high-temperature medium.

2. The enclosed flash-evaporation heat exchanger according to claim 1, wherein an exhaust amount of the negative-pressure fan is greater than an evaporation amount of the atomized water in the enclosed housing to fully discharge the vapor in the enclosed housing.

3. The enclosed flash-evaporation heat exchanger according to claim 1, wherein a pressure of the negative-pressure environment in the enclosed housing is lower than an ambient atmospheric pressure by more than 20 Pa.

4. The enclosed flash-evaporation heat exchanger according to claim 1, wherein a pressure of the second static pressure chamber is lower than the ambient atmospheric pressure by more than 20 Pa.

5. The enclosed flash-evaporation heat exchanger according to claim 1, wherein a pressure regulating device is provided in the second static pressure chamber, and the pressure regulating device is configured to promote flow of vapor in the enclosed housing.

6. The enclosed flash-evaporation heat exchanger according to claim 5, wherein an air inlet of the pressure regulating device is arranged outside the enclosed housing, an air outlet of the pressure regulating device is arranged inside the enclosed housing, a regulating air flow enters the enclosed housing by means of the pressure regulating device to promote the flow of vapor in the enclosed housing.

7. The enclosed flash-evaporation heat exchanger according to claim 6, wherein the pressure regulating device is a tubular structure, one end of the tubular structure is an open end, another end of the tubular structure is a closed end; the open end of the tubular structure is located outside the enclosed housing, a plurality of air outlet holes are defined on a part of the tubular structure located inside the enclosed housing; and the regulating air flow enters the enclosed housing through the open end and the plurality of air outlet holes of the tubular structure.

8. The enclosed flash-evaporation heat exchanger according to claim 5, wherein the pressure regulating device is a fan.

9. The enclosed flash-evaporation heat exchanger according to claim 8, wherein the fan is provided inside the enclosed housing.

10. The enclosed flash-evaporation heat exchanger according to claim 1, wherein the heat exchanging device is a square structure, the water atomization device is provided on one side of the square structure, and the negative-pressure fan is correspondingly provided on the opposite side of the square structure.

11. The enclosed flash-evaporation heat exchanger according to claim 10, wherein a plurality of heat exchanging devices are provided in the enclosed housing and spaced apart.

12. The enclosed flash-evaporation heat exchanger according to claim 10, wherein the water atomization device is provided at a lower part of the enclosed housing, the negative-pressure fan is provided at an upper part of the enclosed housing; and the water atomization device is configured to spray generated atomized water into the enclosed housing from bottom to top.

13. The enclosed flash-evaporation heat exchanger according to claim 10, wherein the water atomization device is provided at an upper part of the enclosed housing, the negative-pressure fan is provided on a side wall of the enclosed housing, and the negative-pressure fan is provided near a lower part of the side wall of the enclosed housing; and the water atomization device is configured to spray generated atomized water into the enclosed housing from top to bottom.

14. The enclosed flash-evaporation heat exchanger according to claim 1, wherein the heat exchanging device is a V-shaped structure, the water atomization device is provided corresponding to two outer side surfaces of the V-shaped structure, and the negative-pressure fan is provided corresponding to a middle cavity of the V-shaped structure.

15. The enclosed flash-evaporation heat exchanger according to claim 1, wherein the heat exchanging device is a cylindrical structure, the water atomization device is provided corresponding to an outer surface of the cylindrical structure, and the negative-pressure fan is provided corresponding to an internal cavity of the cylindrical structure.

16. The enclosed flash-evaporation heat exchanger according to claim 1, wherein the heat exchanging device is a condenser.

17. The enclosed flash-evaporation heat exchanger according to claim 1, wherein an air inlet pipe and an air outlet pipe are provided on the enclosed housing, the air outlet pipe is provided close to the negative-pressure fan, the air inlet pipe is provided away from the negative-pressure fan; a substance to be cooled enters the enclosed housing through the air inlet pipe, and is discharged out of the enclosed housing through the air outlet pipe.

* * * * *